US009369602B2

(12) United States Patent
Mutsuo (10) Patent No.: US 9,369,602 B2
(45) Date of Patent: *Jun. 14, 2016

(54) SCANNER DEVICE AND IMAGE FORMING APPARATUS

(71) Applicant: KYOCERA Document Solutions Inc., Osaka-shi, Osaka (JP)

(72) Inventor: Toshiaki Mutsuo, Osaka (JP)

(73) Assignee: KYOCERA DOCUMENT SOLUTIONS INC., Osaka-shi, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/695,061

(22) Filed: Apr. 24, 2015

(65) Prior Publication Data

US 2015/0312436 A1   Oct. 29, 2015

(30) Foreign Application Priority Data

Apr. 28, 2014   (JP) .................................. 2014-092502

(51) Int. Cl.
 *H04N 1/04*   (2006.01)
 *H04N 1/028*   (2006.01)

(52) U.S. Cl.
 CPC ............ *H04N 1/02815* (2013.01); *H04N 1/04* (2013.01)

(58) Field of Classification Search
 CPC .. H04N 1/02815; H04N 1/04; H04N 1/00806
 USPC ......... 358/497, 474, 475, 486, 488, 482, 483; 250/234–236
 See application file for complete search history.

(56) References Cited

U.S. PATENT DOCUMENTS

| 5,065,434 | A | 11/1991 | Matsuoka et al. |
| 7,627,907 | B2* | 12/2009 | Sawada .................... G06F 21/10 345/212 |
| 8,941,894 | B2* | 1/2015 | Tanaka ............... H04N 1/00806 348/E5.037 |
| 9,025,212 | B2* | 5/2015 | Tanaka ............... H04N 1/00806 358/474 |
| 2004/0012828 | A1* | 1/2004 | Soda .................. H04N 1/00281 358/474 |
| 2007/0001015 | A1 | 1/2007 | Suzuki et al. |
| 2010/0149219 | A1* | 6/2010 | Yasoshima ........... G03G 15/607 345/672 |
| 2011/0188095 | A1* | 8/2011 | Shiraishi .................. H04N 1/04 358/474 |
| 2014/0160538 | A1* | 6/2014 | Tanaka ............... H04N 1/00806 358/475 |

FOREIGN PATENT DOCUMENTS

| JP | H07143340 A | 6/1995 |
| JP | 2006309451 A | 11/2006 |
| JP | 2007179339 A | 7/2007 |
| JP | 2007287009 A | 11/2007 |
| JP | 2008113083 A | 5/2008 |

* cited by examiner

*Primary Examiner* — Cheukfan Lee (57) ABSTRACT

A scanner device has a first mode for reading a normal object placed on a document table and a second mode for reading a self-luminous object placed on the document table. The scanner device includes a light detecting portion and a control portion. The light detecting portion detects light from an object placed on the document table. The control portion switches the reading mode between the first mode and the second mode on the basis of a detection result of the light detecting portion. When an image sensor detects light from the object placed on the document table in the second mode, the sensitivity of the image sensor is automatically adjusted in accordance with the amount of the detected light.

18 Claims, 9 Drawing Sheets

SCANNER DEVICE AND IMAGE FORMING APPARATUS

INCORPORATION BY REFERENCE

The disclosure of Japanese Patent Application No. 2014-92502 filed on Apr. 28, 2014 including the specification, drawings and abstract is incorporated herein by reference in its entirety.

BACKGROUND

The present disclosure relates to a scanner device and an image forming apparatus.

In association with recent developments in informational technology, cellular phones, touch-panel-type tablet devices, and other types of terminal devices have become widely used by general users. These terminal devices have a display portion, such as a liquid crystal screen, for displaying images. Users can acquire desired information through the images displayed on the display portion.

When one user intends to let another user view the information, the user typically sends the image data to the other user's terminal device. However, the recipient user may not always carry the terminal device with him/her, or the communication environment may not be always established around both the users. In such a case, the original user can possibly use a scanner device to directly read the image displayed on his\her terminal device and uses a copier or the like to print out the read image to deliver a copy of the read image to the other user. Such a viewing situation tends to further increase with the prevalence of terminal devices.

Conventionally, an image processing apparatus having a color image scanner that reads a color document is disclosed. The image processing apparatus has two reading modes enabling a reading process of normally reading a document and a reading process of directly reading a display screen of a display, for effecting color compensation of color display. For normally reading a document, a light source for illuminating the document is turned on. On the other hand, for directly reading a display screen of a display, the light source for illuminating the document is turned off because the display itself emits light.

The above-described conventional technique requires users to manually switch the reading modes. Such a manual operation performed every time to switch the reading modes is troublesome and inconvenient.

SUMMARY

A scanner device according to one aspect of the present disclosure has a first mode for reading a normal object placed on a document table, and a second mode for reading a self-luminous object placed on the document table. The scanner device includes a light detecting portion, a control portion and an adjustment portion. The light detecting portion detects light from an object placed on the document table. The control portion switches the reading mode between the first mode and the second mode on the basis of a detection result of the light detecting portion. The adjustment portion adjusts the sensitivity of the image sensor in accordance with the amount of light detected by the light detecting portion in the second mode.

The summary thereof will be given later.

DETAILED DESCRIPTION

Hereinafter, an embodiment of the present disclosure will be described in detail with reference to the drawings. In the following, description will be given by exemplifying a multifunction peripheral having functions including a copying machine, a printer, and a facsimile, as an image forming apparatus having a scanner device according to the present disclosure.

Figure 1:
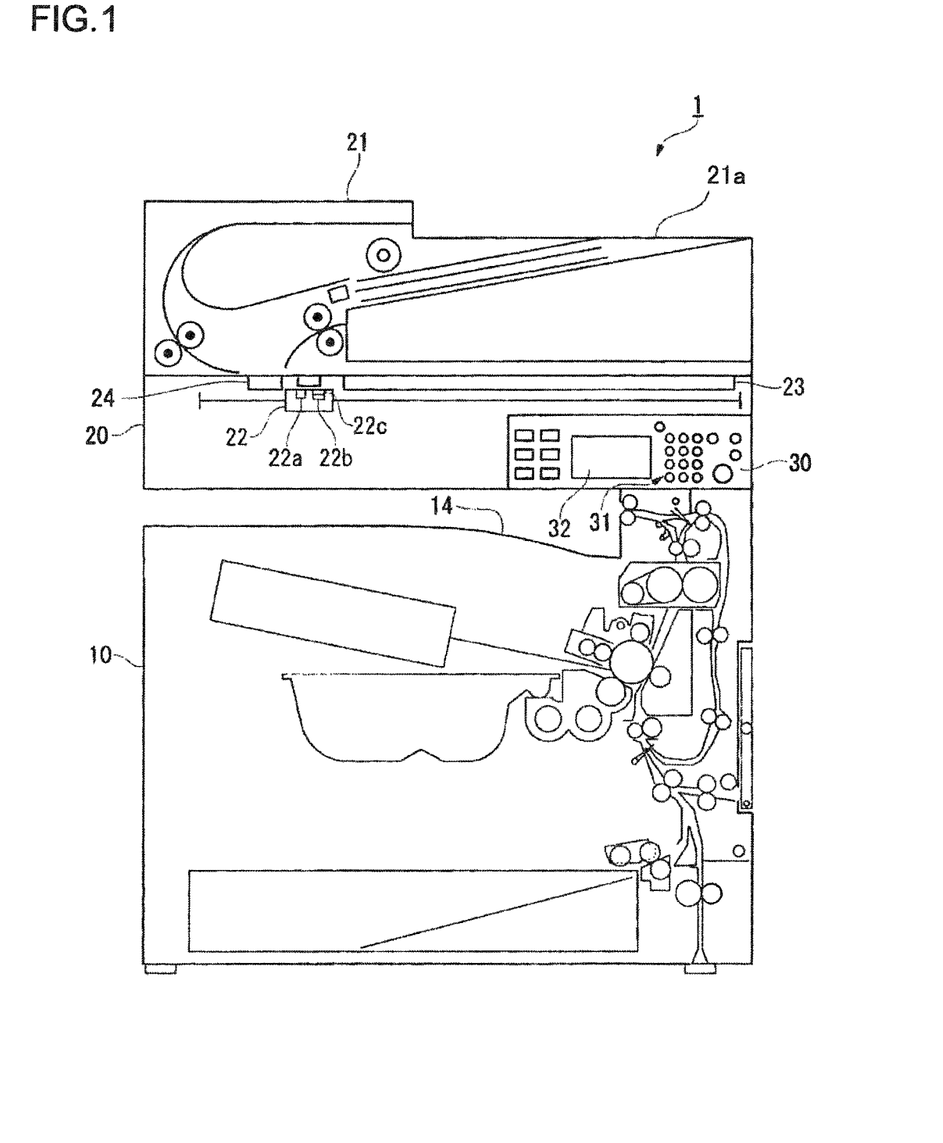
FIG. 1 is a front perspective view showing configuration of major parts of a multifunction peripheral according to an embodiment of the present disclosure.
Figure 2:
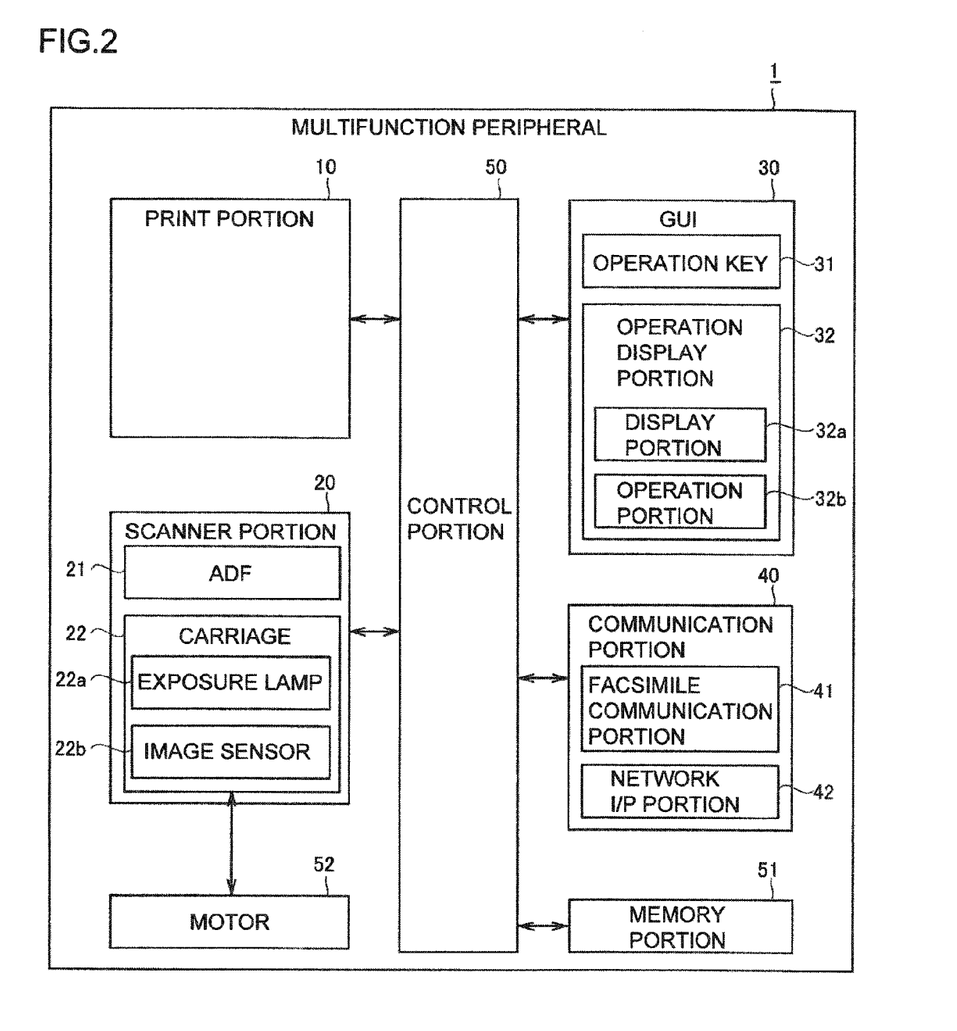
FIG. 2 is a functional block diagram of the multifunction peripheral according to the embodiment of the disclosure.

FIG. 1 is a front perspective view showing configuration of major parts of a multifunction peripheral 1 in the embodiment of the disclosure. FIG. 2 is a functional block diagram of the multifunction peripheral 1 in the embodiment of the disclosure. As shown in FIGS. 1 and 2, the multifunction peripheral 1 includes a print portion 10, a scanner portion (scanner device) 20, a graphical user interface (GUI) 30, a communication portion 40, a control portion 50 and a memory portion 51.

The scanner portion 20 reads a document or the like (object) placed by a user, generates document image data representing an image of the document, and outputs the data to the control portion 50 under the control of the control portion 50. The scanner portion 20 includes an automatic document feeder (ADF) 21, a carriage 22, a document table 23, a document reading slit 24, and other components. The carriage 22 carries an exposure lamp (light source) 22a, an image sensor (light detecting portion) 22b, and other components, and reads documents sequentially fed by the ADF 21 or a document or the like placed on the document table 23. The image sensor 22b is an imaging element enabling photoelectric conversion, such as a charge coupled device (CCD) and a contact image sensor (CIS), used to output electrical signals (e.g., voltage signals) corresponding to the intensity (amount) of light received thereby. The exposure lamp 22a is a light-emitting element, such as an LED, used to irradiate the object with light to read the object.

When an original document set on the document table 23 is read in this embodiment, the carriage 22 is moved in the longitudinal direction (the lateral direction in FIG. 1) of the document table 23. During the movement, light is emitted from the exposure lamp 22a toward the back surface of the document table 23. Thus, the light scans the object in a sub-scanning direction. The light reflected off from the object placed on the document table 23 enters the image sensor 22b that in turn sends an electrical signal corresponding to the reflected light to the control portion 50, the signal representing image data of the object. Thus, image data of the object, such as a document, is read. When an original document fed by the ADF 21 is read, the carriage 22 is moved so as to face the document reading slit 24 (below the document reading slit 24). Light is applied through the document reading slit 24 to the documents sequentially fed by the ADF 21, and is reflected off from the documents to the image sensor 22b that in turn receives the reflected light to read image data of the original documents.

The image sensor 22b of this embodiment has an optical filter 22c that makes external incident light entering the document table 23 undetected. The optical filter 22c of this embodiment is, for example, a band-pass filter. The optical filter 22c is configured so as not to allow light with frequencies of external incident light components to pass therethrough out of light incident to the image sensor 22b. Thus, ambient light causing a disturbance can be prevented from entering the image sensor 22b. Concretely, the optical filter 22c is designed to cut wavelengths of fluorescent light components (peaks at 490 nm, 540 nm, 610 nm in the case of a three band fluorescent light, for example). As a result, the image sensor 22b can detect light (peaks at 470 nm and 580 nm in the case of white light emitting diode (LED) of liquid crystal backlight) from a display screen of a terminal device, which will be described later, without influence of disturbance.

The GUI 30 outputs a signal (operation signal) associated with a user's operation to the control portion 50, while displaying various types of information, such as information showing the state of the multifunction peripheral 1 in accordance with the control by the control portion 50. The GUI 30 includes an operation key 31 and an operation display portion 32. The operation key 31 includes hard keys such as a copy start key, a copy stop/clear key, a ten-digit keypad (numeric input keys) and a function switching key. The function switching key is provided for users to switch the operation mode of the multifunction peripheral 1 to the intended one of the copying function, printing function, scanning function and facsimile function implemented by the multifunction peripheral 1.

The operation display portion 32 includes a display portion 32a and an operation portion 32b. The display portion 32a displays predetermined images under the control of the control portion 50. The operation portion 32b outputs an operation signal corresponding to an operation made on the display screen of the display portion 32a to the control portion 50. The display portion 32a is, for example, a liquid crystal panel or an organic EL panel. The operation portion 32b is, for example, a touch panel disposed oppositely to the display screen of the display portion 32a, and outputs a signal indicating the coordinates of a portion depressed by the user, as the aforementioned operation signal.

The communication portion 40 communicates with a facsimile device at the other end, or an external device such as a personal computer, and includes a facsimile communication portion 41 and a network I/P portion 42.

The control portion 50 integrally controls the overall operation of the multifunction peripheral 1 on the basis of an operation signal input from the GUI 30 and a signal received from an external device via the communication portion 40. The control portion 50 is composed of an internal memory, a central processing unit (CPU), various I/O interface lines for sending/receiving data to/from other portions, and other components.

The control portion 50 can switch the reading mode of the scanner portion 20 between a normal document scan mode (first mode) and a display screen scan mode (second mode). The normal document scan mode is to read a normal object (e.g., document) placed on the document table 23. The display screen scan mode is to read a display screen (e.g., liquid crystal screen, organic EL screen) of a self-luminous object (e.g., cellular phone, smartphone, tablet device) placed on the document table 23. Table 1 shows examples of initial settings of the reading conditions in the normal document scan mode and the display screen scan mode.

TABLE 1

| | Initial settings for normal document scan mode | Initial settings for display screenscan mode |
|---|---|---|
| original size | Standard size (e.g., A4, A3) Select standardized size of sheet by auto size detection | Cellular phone size, Smartphone size, Tablet size |
| Exposure | Normal (4th of 7 levels/Auto exposure) | Off |
| image sensor sensitivity | Normal (preset value) | Auto adjustment |
| Resolution | 300 DPI | 600 DPI |

As shown in Table 1, in the display screen scan mode, the size of an original to be read is preset for each type of terminal device (cellular phone, smartphone, tablet device) rather than the standardized sizes defined by a standard as in the normal document scan mode. In addition, the illumination condition of the exposure lamp 22a in the display screen scan mode is set differently from that in the normal document scan mode. Specifically speaking, the exposure lamp 22a is turned on in the normal document scan mode, but is turned off in the display screen scan mode. Also, the reading resolution (dots per inch (DPI)) of the image sensor 22b is initially set to be higher in the display screen scan mode than that in the normal document scan mode. Furthermore, the sensitivity of the image sensor 22b, such as a CCD, is set to a preset value in the normal document scan mode; however, the sensitivity of the image sensor 22b is automatically adjusted in the display screen scan mode.

The memory portion 51 stores a plurality of reading conditions for the display screen scan mode. The reading conditions are set, for example, for each type of terminal device (cellular phone, smartphone, tablet device). As will be described in detail later, the control portion 50 of the present embodiment automatically switches the reading mode of the scanner portion 20 to the normal document scan mode or the display screen scan mode on the basis of a light detection result from the image sensor 22b.

Figure 3:
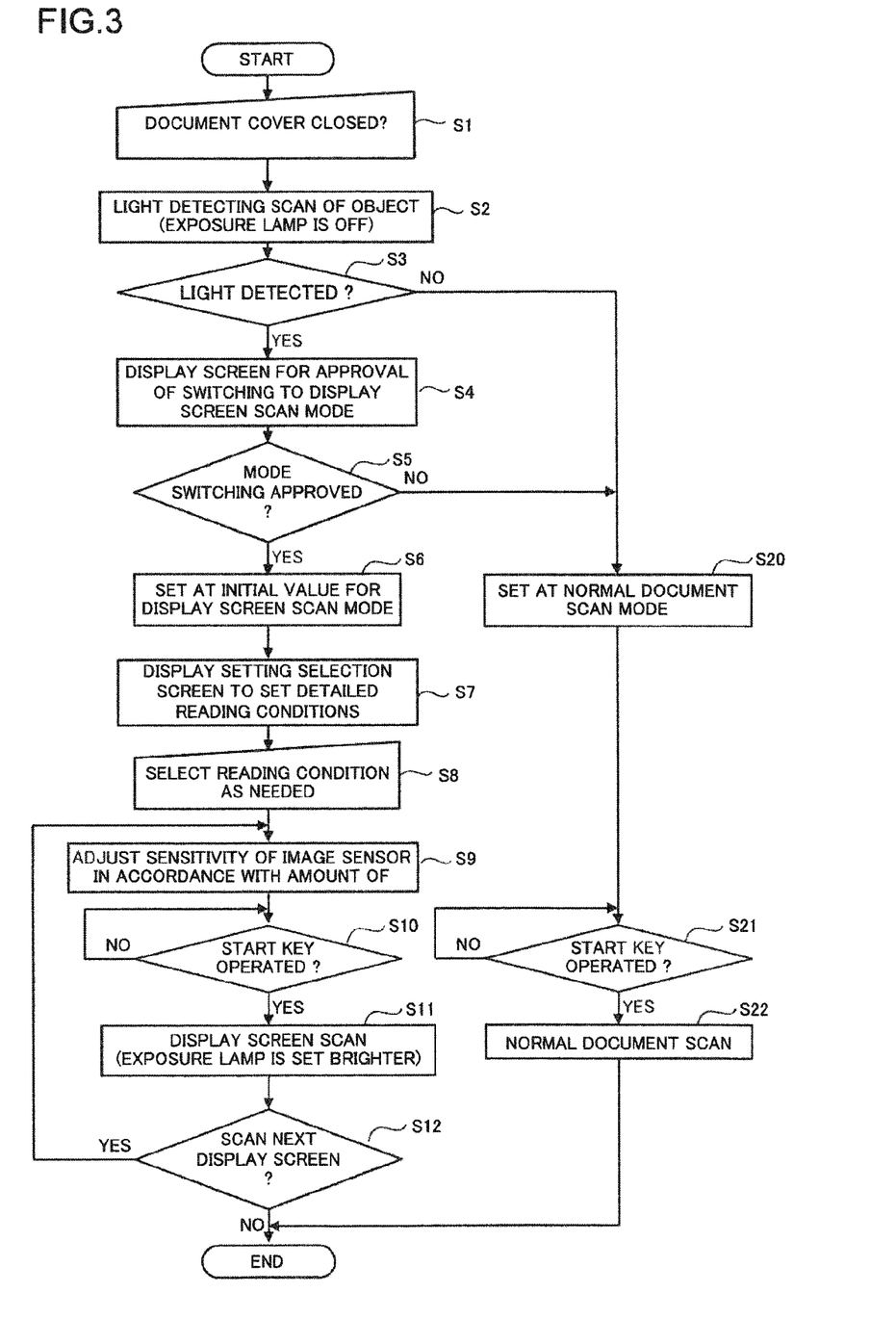
FIG. 3 is a flowchart showing operation of the multifunction peripheral according to the embodiment of the disclosure (particularly, a sequence of various processes of the scanner portion).

Next, operation of the multifunction peripheral 1 configured as described above will be described. FIG. 3 is a flowchart showing operation of the multifunction peripheral 1 in the embodiment of the present disclosure (a sequence of various processes particularly in the scanner portion 20). For reading an image of a certain object with the scanner portion 20, a user first places the object on the document table 23 and closes a document cover 25. The document table 23 is provided with a sensor (not shown) for detecting whether a document holding cover 21a is open or closed. The control portion 50 determines whether or not the document holding cover 21a is closed based on the sensor's output signal that changes when the document holding cover 21a is closed (step S1).

Figure 4:
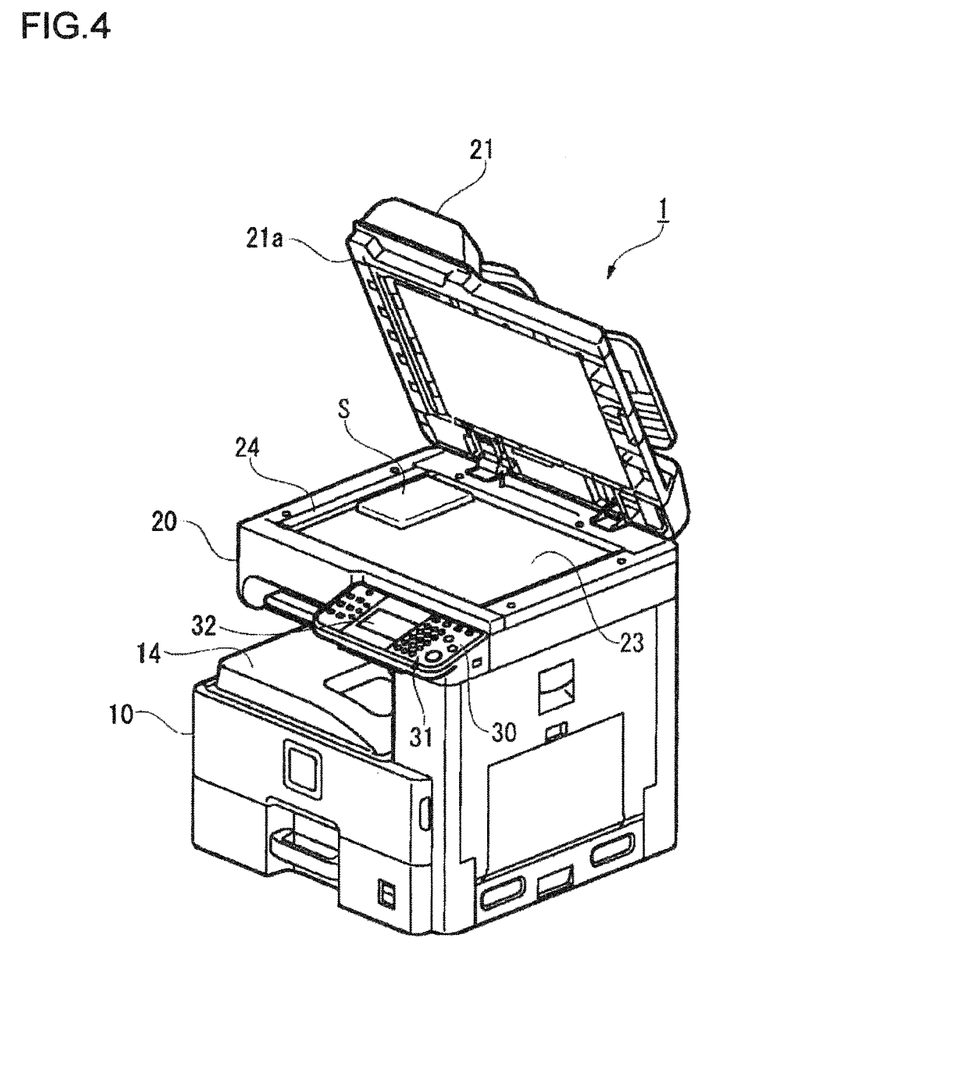
FIG. 4 illustrates a terminal device placed, as an object to be read, on a document table according to the embodiment of the disclosure.

FIG. 4 illustrates a terminal device S placed as an object to be read on the document table 23 according to the embodiment of the present disclosure. As shown in FIG. 4, a user opens a document holding cover 21a that is integrally formed with the ADF 21, and places the terminal device S with its corner aligned with the back corner of the document table 23 in the same manner for a normal document. When the object is a thick item like the terminal device S, the document holding cover 21a will be partly open, and ambient light will enter the document table 23.

Next, the control portion 50 performs a light detecting scan to detect light from the object placed on the document table 23 (step S2). The light detecting scan is triggered, for example, when the user operates the start key of the operation key 31. This light detecting scan includes causing the image sensor 22b to read the object placed on the document table 23 and detecting light from the object based on the output signal from the image sensor 22b. In other words, the light detecting scan is an operation for detecting the presence or absence of light from the object (terminal device S) placed on the document table 23 by the image sensor 22b in the carriage 22 moving longitudinally along the document table 23. Thus, the control portion 50 implements a light detecting portion of the present disclosure by causing the image sensor 22b to perform a light detecting scan.

The control portion 50 performs the light detecting scan to determine whether or not the object placed on the document table 23 itself emits light. The light detecting scan is different from a normal document scan. In the normal document scan, the exposure lamp 22a irradiates the object with light. In the light detecting scan, however, the light emitted from the exposure lamp 22a can interfere with the detection of light. For this reason, the control portion 50 turns off the exposure lamp 22a during the light detecting scan by the image sensor 22b. This allows the image sensor 22b to detect light emitted from the object (e.g., backlight of a liquid crystal screen), thereby enabling the light detection in step S2.

In this embodiment, the image sensor 22b has an optical filter 22c for making external incident light entering the document table 23 undetected. As shown in FIG. 4, when the object is the terminal device S having thickness, the document holding cover 21a cannot be completely closed. In such a case, the optical filter 22c prevents external incident light (e.g., wavelengths of fluorescent light components) entering the document table 23 from passing therethrough. As a result, the image sensor 22b can detect only the light from the object placed on the document table 23 and the light detecting accuracy in step S2 can be improved.

Next, the control portion 50 determines whether or not the image sensor 22b detects light from the object as a result of the light detecting scan (step S3). Specifically, the control portion 50 determines that light from the object is detected when the level of the electrical signal output from the image sensor 22b is greater than a predetermined threshold. When the determination in step S3 is "YES", namely the object placed on the document table 23 is a self-luminous object such as the terminal device S, the control portion 50 proceeds to step S4. On the other hand, when the determination in step S3 is "NO", namely the object placed on the document table 23 is not a self-luminous object such as the terminal device S but is a normal document, the control portion 50 proceeds to step S20.

In the case where the control portion 50 proceeds to step S20, the control portion 50 switches the reading mode of the scanner portion 20 to the aforementioned normal document scan mode. When the start key is operated by the user (step S21), the control portion 50 executes the normal document scan (the exposure lamp 22a is ON) (step S22), and then a scan sequence ends at the completion of the normal document scan. On the other hand, in the case where the control portion 50 proceeds to step S4, the control portion 50 controls the display portion 32a to display a screen for approval of switching to a display screen scan mode, prior to switching the reading mode of the scanner portion 20 to the aforementioned display screen scan mode.

Figure 5:
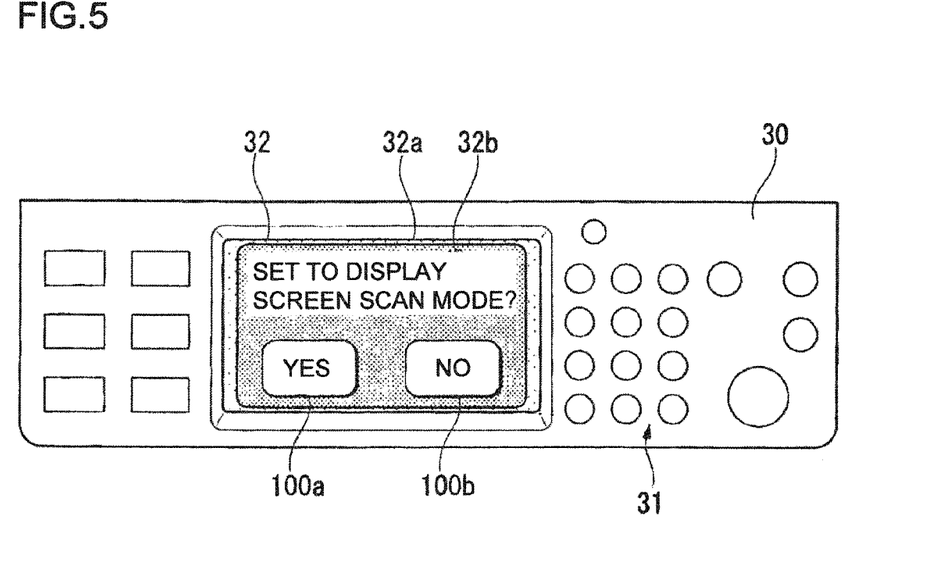
FIG. 5 shows a screen for approval of switching to display screen scan mode in the embodiment of the disclosure.

FIG. 5 shows a screen for approval of switching to a display screen scan mode in the embodiment of the present disclosure. As shown in FIG. 5, the control portion 50 controls the display portion 32a to display an approval button 100a and a disapproval button 100b for switching to the display screen scan mode. The control portion 50 determines which one of the approval button 100a indicating "YES" and the disapproval button 100b indicating "NO" is depressed (step S5). The process in step S5 is to confirm the user's intention prior to switching the reading mode of the scanner portion 20.

When the determination in step S5 is "YES", namely the object placed on the document table 23 is a self-luminous object like the terminal device S, and the approval button 100a is depressed, the flow proceeds to step S6. On the other hand, when the determination in step S5 is "NO", namely the disapproval button 100b is depressed because the object placed on the document table 23 is actually a normal document and the user is suggested to switch to an unintended mode due to false detection in the light detecting scan, the flow proceeds to step S20.

When the flow proceeds to step S20, the control portion 50 switches the reading mode of the scanner portion 20 to the aforementioned normal document scan mode. Then the control portion 50 executes a normal document scan (the exposure lamp 22a is ON) (step S22) in response to an operation of the start key made by the user (step S21), and then the scan sequence ends at the completion of the normal document scan.

Figure 8A:
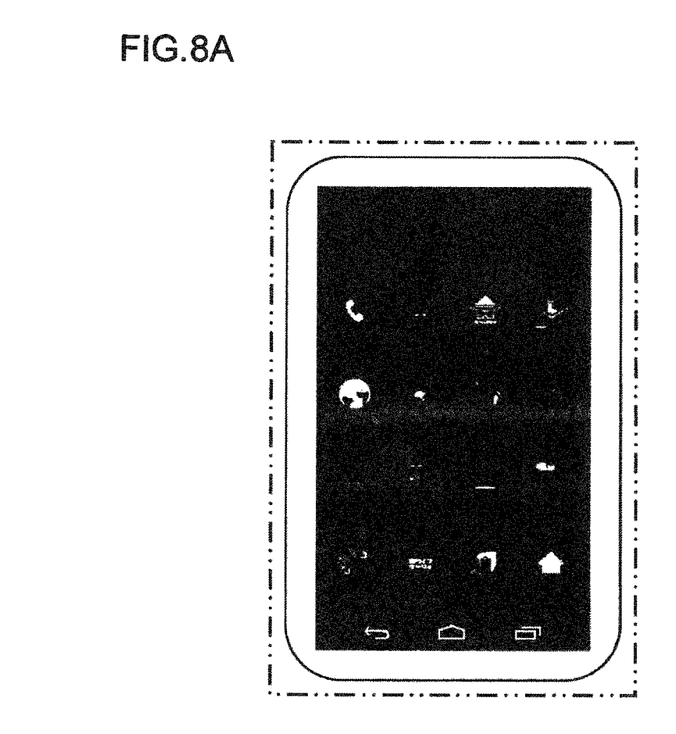
FIG. 8A is an image of a liquid crystal screen of a terminal device read in normal document scan mode in the embodiment of the preset disclosure.
Figure 8B:
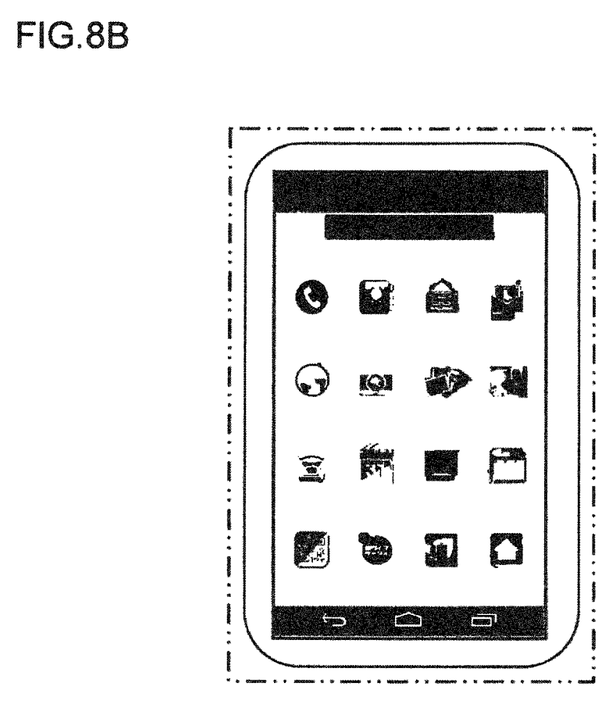
FIG. 8B is a view of an image of the liquid crystal screen of the terminal device read in the display screen scan mode.

On the other hand, when the flow proceeds to step S6, the control portion 50 switches the reading mode of the scanner portion 20 to the aforementioned display screen scan mode. Then, the control portion 50 sets the initial settings for the display screen scan mode in accordance with the conditions indicated in Table 1. Specifically, the control portion 50 changes the setting of the exposure lamp 22a to "OFF" as well as the reading resolution to 600 DPI. If light is emitted from the exposure lamp 22a during the reading operation in the display screen scan mode, clear image data may not be obtained because the light from the exposure lamp 22a interferes with the light emitted from the object. To prevent interference, in the display screen scan mode according to the embodiment of the disclosure, image data of the object is read out while the exposure lamp 22a is turned off so that the image sensor 22b can receive only the light emitted from the object. In this case, if the sensitivity of the image sensor 22b is set to a preset value, the image sensor 22b may not be able to receive sufficient light because the luminance (amount of light) differs from object to object. For example, when the amount of light from the display screen of the terminal device S, which is an object, is low, the read image data is dark, and on the contrary, when the amount of light is too much, the obtained image data results in being too bright. Actually, if a comparison is made between a terminal device S with a liquid crystal panel and a terminal device S with an organic EL panel, these panels have different emission mechanisms and the liquid crystal panel including a back light has greater luminance than the organic EL panel. Therefore, the image data of the display screens of those terminal devices S read by the image sensor 22b with a fixed sensitivity exhibits different qualities. Specifically speaking, the read image of the liquid crystal panel (see FIG. 8B) is clearer, and the read image of the organic EL panel (see FIG. 8A) is relatively poor in clarity. FIG. 8A shows an image of a screen of the organic EL panel of the terminal device S, the image being read in the display screen scan mode according to the embodiment of the disclosure. FIG. 8B shows an image of a screen of the liquid crystal panel of the terminal device S read in the display screen scan mode. As shown in FIG. 8A, the screen image of the organic EL panel is too dark to identify the screen. On the other hand, as shown in FIG. 8B, the screen image of the liquid crystal panel is identifiable. In this embodiment, the sensitivity of the image sensor 22*b* in the display screen scan mode is initially set to automatic adjustment according to the object. The automatic adjustment of the sensitivity of the image sensor 22*b* will be described later.

Subsequent to step S6, the control portion 50 controls the display portion 32*a* to display a setting selection screen for selecting detailed reading conditions in the display screen scan mode (step S7).

Figure 6:
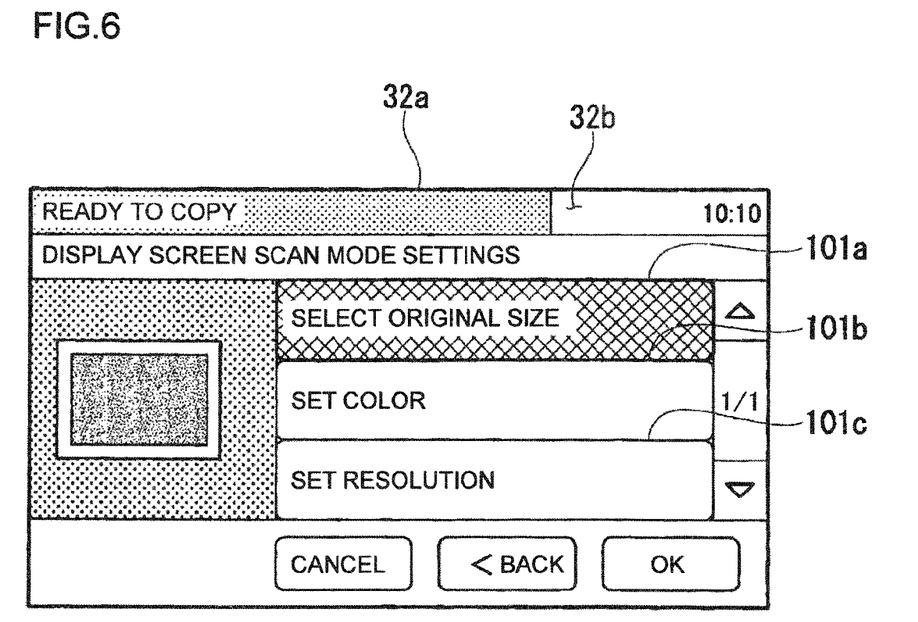
FIG. 6 shows a setting selection screen for setting reading conditions in the display screen scan mode according to the embodiment of the disclosure.

FIG. 6 shows the setting selection screen used to set the reading conditions for the display screen scan mode in the embodiment of the disclosure. As shown in FIG. 6, the control portion 50 controls the display portion 32*a* to display buttons 101*a* to 101*c* for individually changing the initial settings of the reading conditions for the display screen scan mode. In the present embodiment, the button 101*a* is assigned to "SELECT ORIGINAL SIZE", the button 101*b* is assigned to "SET COLOR", and the button 101*c* is assigned to "SET RESOLUTION". In "SELECT ORIGINAL SIZE", a range to be read can be set appropriately for display screens of terminal devices S. In "SET COLOR", data of the read image can be set to appear in full color, gray scale, or monochrome. In "SET RESOLUTION", the initially set resolution value of 600 DPI can be changed to any values. The user operates the buttons 101*a* to 101*c* as needed to select or change the reading conditions (step S8). As described above, the exposure lamp 22*a* is turned off to read an object in the display screen scan mode in this embodiment. Therefore, light exposure in the display screen scan mode cannot be set on the setting selection screen in FIG. 6, and therefore the initial setting of the light exposure remains the same. In short, the setting of light exposure cannot be changed from the "OFF" setting.

Figure 7:
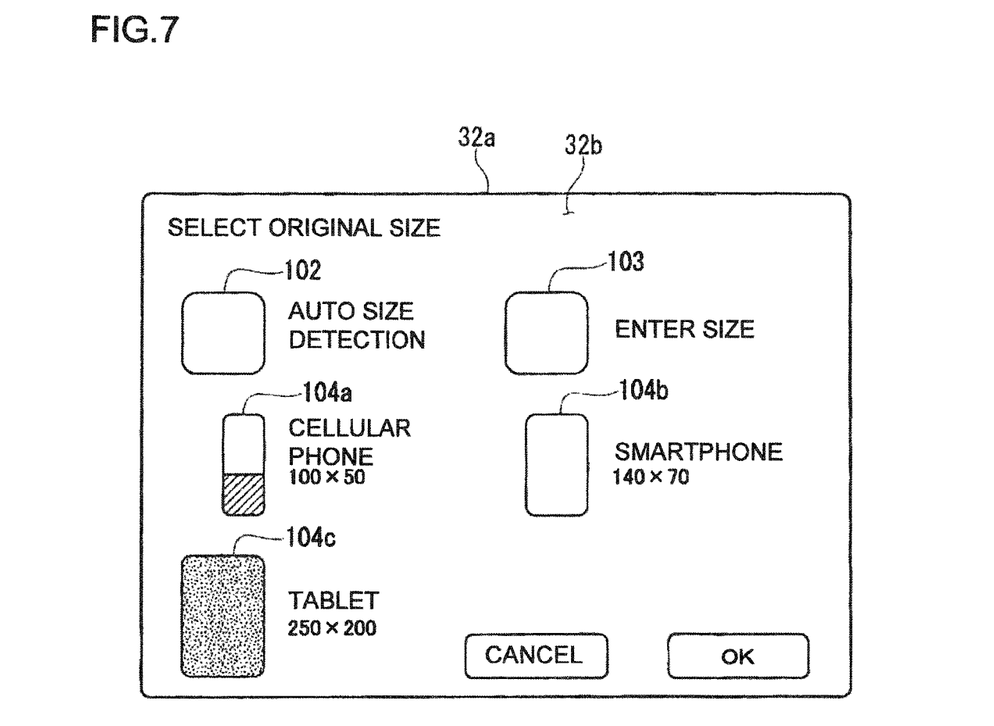
FIG. 7 shows a document size selection screen for selecting an original size, which is a reading condition in the display screen scan mode, according to the embodiment of the disclosure.

FIG. 7 shows an original size selection screen for selecting a document size, which is a reading condition in the display screen scan mode, according to the embodiment of the disclosure. If the button 101*a* for "SELECT ORIGINAL SIZE" is depressed, as shown in FIG. 7, the control portion 50 controls the display portion 32*a* to display a button 102 for "AUTO SIZE DETECTION", and a button 103 for "ENTER SIZE", and a button 104*a* for "CELLULAR PHONE", a button 104*b* for "SMARTPHONE", and a button 104*c* for "TABLET" that are the reading conditions (original size) preliminarily stored in the memory portion 51.

The button 102 for "AUTO SIZE DETECTION" is provided to instruct the control portion 50 to execute a process for detecting the original size of a self-luminous object like the terminal device S in the same manner as automatic size detection for a normal document. The button 103 for "ENTER SIZE" is provided for a user to manually enter the size of the original, for example, when the terminal device S is a new product or a non-standardized product. When the self-luminous object placed on the document table 23 is any one of "CELLULAR PHONE", "SMARTPHONE" or "TABLET DEVICE", the buttons 104*a* to 104*c* are depressed by a user to select a corresponding one. Depressing any one of the buttons allows users to easily select a reading condition associated with the button from the previously stored reading conditions.

In this embodiment, when a user selects and depresses any one of the buttons 104*a* to 104*c* for "CELLULAR PHONE", "SMARTPHONE" or "TABLET DEVICE", an appropriate "ORIGINAL SIZE" value is set in accordance with the depressed button. Thus, only by selecting the type of an object to be read (cellular phone, smartphone or tablet device in the present embodiment), the user can cause the control portion 50 to automatically set the optimum "ORIGINAL SIZE" to read the display screen of the object. If individual setting change is preferred, the user can return to the screen shown in FIG. 6 to designate "SELECT ORIGINAL SIZE" and set a desired size.

Next, the control portion 50 automatically adjusts the sensitivity of the image sensor 22*b* (step S9). Specifically, the sensitivity of the image sensor 22*b* is automatically set in accordance with the amount of light received by the image sensor 22*b* when light detection scan is performed in step S2.

There is a method for adjusting the sensitivity of the image sensor 22*b* by increasing or decreasing the amount of reflected light per unit area of the read display screen, and a possible way of increasing or decreasing the amount of reflected light is to adjust the travel speed of the carriage 22. In this embodiment, the travel speed of the carriage 22 is changed in proportion to the amount of light obtained during a light detecting scan. For example, if a self-luminous object cannot provide a sufficient amount of light for image reading, the carriage 22 is decelerated slower than when normal image reading is performed. More specifically, if the amount of light from the self-luminous source is less than a reference amount of light (e.g., an amount of light during normal reading), the travel speed of the carriage 22 is reduced in proportion to the amount of light. On the other hand, if the amount of light from the self-luminous source is greater than the reference amount of light, the travel speed of the carriage 22 is increased in proportion to the amount of light, thereby shortening the reading time. The travel speed of the carriage 22 is adjusted by controlling the rotational speed of a motor that drives the carriage 22.

Upon completion of the sensitivity adjustment of the image sensor 22*b*, the control portion 50 executes a display screen scan (step S11) in response to an operation of the start key made by the user (step S10).

As described above, when reading is performed in the display screen scan mode, not only the exposure lamp 22*a* is turned off, but also the travel speed of the carriage 22 is adjusted so that the sensitivity of the image sensor 22*b* changes in accordance with the amount of light obtained at a light detecting scan. Therefore, even if the self-luminous object cannot provide a sufficient amount of light, the sensitivity of the image sensor 22*b* is appropriately adjusted by adjusting the travel speed. Thus, clear image of the self-luminous display screen of the terminal device S can be obtained through simple operations regardless of the amount of light emitted from the terminal device S. In a case where another display screen is successively scanned, the terminal device S whose display screen has been switched to the other is placed on the document table 23, the document cover 21*a* is closed, and then the control portion 50 returns to step S9 to repeat processes after step S9. On the other hand, when scanning of the next display screen will not be conducted, the scan sequence in the display screen scan mode ends.

According to the embodiment described above, when the image sensor 22*b* detects light from the object placed on the document table 23, the control portion 50 automatically switches the reading mode from the normal document scan mode that is normally set, to the display screen scan mode dedicated for a self-luminous object. Therefore, the user can cause the display screen of the terminal device S to be read by a simple operation without the necessity of complicated operation. Therefore, it is possible to obtain the scanner portion 20 and the multifunction peripheral 1 capable of reading the display screen of the terminal device S with simple operation.

In addition, the control portion 50 turns off the exposure lamp 22a and adjusts the sensitivity of the image sensor 22b in accordance with the amount of light obtained at the light detecting scan to perform reading in the display screen scan mode, thereby obtaining a clear display image of the self-luminous terminal device S regardless of the amount of light emitted from the terminal device S.

The preferred embodiment of the present disclosure has been described by referring to the drawings; however, the present disclosure is not limited to the above embodiment. The forms, combinations and the like of the constituents shown in the above embodiment are merely examples, and various modifications may be made according to particular design requests and the like without departing from the scope of the subject matter of the present disclosure.

Although the sensitivity of the image sensor 22b is adjusted by increasing or decreasing the travel speed of the carriage 22 in the aforementioned embodiment, the present disclosure is not limited thereto. For example, in the case where the image sensor 22b is a CCD, the sensitivity of the CCD is adjusted in the following manner. Specifically, a CCD generally includes a shift gate that determines the storage time of a light signal according to the cycle of an input pulse signal. The shift gate is an electronic device used to transfer signal charges, which are derived from the light signal stored in a photodiode of the CCD, to a shift register of the CCD to output the charges in sequence. Thus, changing the cycle of a pulse signal (shift pulse) for the shift gate in the CCD changes the storage time to adjust the sensitivity of the CCD. In a case where the amount of light is insufficient for reading in the display screen scan mode and doubling the reading light is required, for example, the cycle of the pulse signal is doubled to double the storage time, thereby increasing the sensitivity. In this case, it is preferred to halve the reading speed of the CCD (the travel speed of the carriage 22) in the display screen scan mode in accordance with the change of the storage time. Thus, the resolution in the subscanning direction becomes constant without fluctuations, and therefore images can be stably read.

The image sensor 22b used for reading an image of an object is configured to be also used as a light detecting portion in the above-described embodiment; however, the present disclosure is not limited thereto, and a dedicated light detecting sensor may be provided additionally as the light detecting portion.

In addition, processes after step S9 are repeated to scan the next display screen in the above-described embodiment; however, the previously read image can be displayed, for example, on the screen shown in FIG. 6 as a preview together with an adjustment button for the sensitivity of the image sensor 22b in order to appropriately adjust the sensitivity.

Although the above embodiment has described the image forming apparatus according to the present disclosure by referring to the multifunction peripheral 1, the present disclosure is not limited thereto, and can be applied to other types of image forming apparatuses, such as a copying machine. Furthermore, the present disclosure also can be applied to a standalone scanner device independent from the image forming apparatus. In this case, the constituents such as the control portion are provided in the scanner device.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

What is claimed is:

1. A scanner device having a first mode for reading a normal object placed on a document table by an image sensor, and a second mode for reading a self-luminous object placed on the document table by the image sensor, the scanner device comprising:
    a light detecting portion that detects light from an object placed on the document table;
    a control portion that switches the reading mode between the first mode and the second mode on the basis of a detection result of the light detecting portion; and
    an adjustment portion that adjusts the sensitivity of the image sensor in accordance with an amount of light detected by the light detecting portion in the second mode.

2. The scanner device according to claim 1, comprising a light source that illuminates an object placed on the document table, wherein
    the control portion reads the self-luminous object with the light source turned off in the second mode.

3. The scanner device according to claim 2, wherein
    the control portion turns off the light source when the light detecting portion conducts detection.

4. The scanner device according to claim 3, wherein
    the light detecting portion causes the image sensor to read an object placed on the document table and detects light from the object based on an output signal from the image sensor.

5. The scanner device according to claim 4, wherein
    the light detecting portion has an optical filter for making external incident light entering the document table undetected.

6. The scanner device according to claim 4, wherein
    the adjustment portion adjusts the sensitivity of the image sensor by changing the reading speed of the image sensor in the second mode in accordance with the amount of light detected by the light detecting portion.

7. The scanner device according to claim 4, wherein
    the image sensor is a CCD line sensor including a shift gate that determines the storage time of a light signal according to the cycle of a pulse signal to be input, and
    the adjustment portion adjusts the sensitivity of the CCD sensor by changing the cycle of the pulse signal according to the amount of light detected by the light detecting portion and thereby changing the storage time.

8. The scanner device according to claim 3, wherein
    the adjustment portion adjusts the sensitivity of the image sensor by changing the reading speed of the image sensor in the second mode in accordance with the amount of light detected by the light detecting portion.

9. The scanner device according to claim 8, wherein
    the adjustment portion changes the reading speed of the image sensor in the second mode in accordance with the storage time.

10. An image forming apparatus comprising the scanner device according to claim 9.

11. An image forming apparatus comprising the scanner device according to claim 4.

12. The scanner device according to claim 3, wherein
    the image sensor is a CCD line sensor including a shift gate that determines the storage time of a light signal according to the cycle of a pulse signal to be input, and
    the adjustment portion adjusts the sensitivity of the CCD sensor by changing the cycle of the pulse signal according to the amount of light detected by the light detecting portion and thereby changing the storage time.

13. An image forming apparatus comprising the scanner device according to claim 3.

14. The scanner device according to claim 1, wherein the adjustment portion adjusts the sensitivity of the image sensor by changing the reading speed of the image sensor in the second mode in accordance with the amount of light detected by the light detecting portion.

15. An image forming apparatus comprising the scanner device according to claim 14.

16. The scanner device according to claim 1, wherein the image sensor is a CCD line sensor including a shift gate that determines the storage time of a light signal according to the cycle of a pulse signal to be input, and the adjustment portion adjusts the sensitivity of the CCD sensor by changing the cycle of the pulse signal according to the amount of light detected by the light detecting portion and thereby changing the storage time.

17. An image forming apparatus comprising the scanner device according to claim 16.

18. An image forming apparatus comprising the scanner device according to claim 1.

* * * * *